(12) United States Patent
Yoo et al.

(10) Patent No.: US 9,035,883 B2
(45) Date of Patent: May 19, 2015

(54) SYSTEMS AND METHODS FOR MODIFYING VIRTUAL KEYBOARDS ON A USER INTERFACE

(75) Inventors: Hayeon Yoo, Gyeong-gi-do (KR); So Young Kwak, Gyeong-gi-do (KR); Sun-Min Oh, Gyeong-gi-do (KR)

(73) Assignee: Google Technology Holdings LLC, Mountain View, CA (US)

( * ) Notice: Subject to any disclaimer, the term of this patent is extended or adjusted under 35 U.S.C. 154(b) by 97 days.

(21) Appl. No.: 13/413,755

(22) Filed: Mar. 7, 2012

(65) Prior Publication Data

US 2013/0234942 A1   Sep. 12, 2013

(51) Int. Cl.
| | | |
|---|---|---|
| *G06F 3/02* | (2006.01) | |
| *G09G 5/00* | (2006.01) | |
| *G06F 3/041* | (2006.01) | |
| *G06F 3/0488* | (2013.01) | |
| *G06F 1/16* | (2006.01) | |
| *G06F 3/042* | (2006.01) | |

(52) U.S. Cl.
CPC .......... *G06F 3/04886* (2013.01); *G06F 3/0426* (2013.01); *G06F 1/1673* (2013.01)

(58) Field of Classification Search
CPC ... G06F 3/0202; G06F 3/0219; G06F 3/0213; G06F 3/023; G06F 3/0488; G06F 3/04883; G06F 3/044; G06F 3/04886; G06F 3/045; G06F 1/1675; G06F 3/0426; G06F 1/1673
USPC .................................................. 345/168, 173
See application file for complete search history.

(56) References Cited

U.S. PATENT DOCUMENTS

| | | | |
|---|---|---|---|
| 2008/0046496 A1 | 2/2008 | Kater | |
| 2008/0259039 A1 | 10/2008 | Kocienda et al. | |
| 2009/0237359 A1* | 9/2009 | Kim et al. | ...................... 345/168 |
| 2010/0097321 A1 | 4/2010 | Son et al. | |
| 2010/0241983 A1 | 9/2010 | Walline et al. | |
| 2011/0242138 A1* | 10/2011 | Tribble | ......................... 345/663 |
| 2011/0258565 A1 | 10/2011 | Arscott et al. | |
| 2012/0081305 A1* | 4/2012 | Schrock | ........................ 345/173 |
| 2012/0206363 A1* | 8/2012 | Kyprianou et al. | ........... 345/168 |

(Continued)

FOREIGN PATENT DOCUMENTS

| | | |
|---|---|---|
| EP | 2077491 A1 | 7/2009 |
| EP | 2128750 A2 | 12/2009 |

OTHER PUBLICATIONS

Microsoft Corporation, "Accessibility in Windows 7", http://www.microsoft.com/enable/products/windows7/, printed on Jan. 25, 2012, 8 pages.

(Continued)

*Primary Examiner* — Aneeta Yodichkas
(74) *Attorney, Agent, or Firm* — Shumaker & Sieffert, P.A.

(57) ABSTRACT

A method and apparatus for modifying virtual keyboards is disclosed. An electronic device displays (705) a first virtual keyboard on a user interface. The electronic device detects (710) a selection of the first virtual keyboard and identifies (715) a user interaction with the first virtual keyboard. The user interaction can be a drag-and-drop resizing, a multiplicative selection of the user interface, or other gestures. After identifying a location associated with the user interaction, the electronic device determines (735, 750, 760) a second virtual keyboard of a different type than the first virtual keyboard based on the location and displays (740, 765) the second virtual keyboard on the user interface.

22 Claims, 7 Drawing Sheets

(56) References Cited

U.S. PATENT DOCUMENTS

2012/0206370 A1* 8/2012 Ivanovic .................. 345/173
2013/0002562 A1* 1/2013 Leskela et al. ............ 345/169

OTHER PUBLICATIONS

C. J. Lippstreu, "Swype 3.0 for Android Honeycomb tablets (video review)", http://www.smartkeitai.com/swype-3-0-for-android-honeycomb-tablets-video-review/ as referenced in http://www.howardforums.com/showthread.php/1721047-Swype-3.0-beta-with-predictive-tap-and-resize-moveable-keyboard-for-Honeycomb, Jun. 15, 2011, 5 pages.

Patent Cooperation Treaty, "PCT Search Report and Written Opinion of the International Searching Authority" for International Application No. PCT/US2013/026563, May 15, 2013, 9 pages.

School Freeware LLC, "Big Screen Keys Download", www.schoolfreeware.com/Big_Screen_Keys.html, downloaded Jun. 29, 2012, 3 pages.

Adam Marks, Resize Touchpad Keyboard (webOS 3.0), www.webosnation.com/resize-touchpad-keyboard-webos-3-0, Jul. 7, 2011, 3 pages.

C.J. Lippstreu, Swype 3.0 for Android Honeycomb tablets (video review), www.smartkeitai.com/swype-3-0-for-android-honeycomb-tablets-video-review/, Jun. 15, 2011, 4 pages.

International Preliminary Report on Patentability from International Application No. PCT/US2013/026563, mailed Sep. 18, 2014, 6 pages.

* cited by examiner

SYSTEMS AND METHODS FOR MODIFYING VIRTUAL KEYBOARDS ON A USER INTERFACE

FIELD

This application generally relates to interacting with an electronic device, and more particularly to platforms and techniques for modifying the display of virtual keyboards on a user interface of an electronic device.

BACKGROUND

Current electronic devices such as tablet devices support the display of virtual keyboards. In operation, an electronic device displays differently-sized virtual keyboards based on changes in the orientation of the electronic devices. For example, a first virtual QWERTY keyboard size can be displayed in a portrait orientation of the electronic device and a second virtual QWERTY keyboard size can be displayed when the electronic device is in a landscape orientation. The differences in overall size of the virtual keyboards affect the size (and sometimes placement) of individual keys of the virtual keyboard. The type of virtual keyboard, however, remains the same regardless of the size.

Different types of virtual keyboards may be variations of QWERTY keyboards (e.g., 101-key QWERTY, 60-key QWERTY, 35-key QWERTY, etc.), numeric-type keypads (e.g., 12-key Bell, 17-key calculator), and others. Although a user of the electronic device is often able to switch among different sizes of virtual keyboards (e.g., portrait and landscape sizes of any particular virtual keyboard), the user must often access a separate menu or selection function of the electronic device to switch among different types of virtual keyboards. This functionality requires multiple steps and is time-consuming, and the user may end up switching keyboard types less often than the user desires.

Accordingly, there is an opportunity for more effective techniques for modifying the display of virtual keyboards on an electronic device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

A method and apparatus for an electronic device in a communication system promotes effective and efficient modification of virtual keyboards. The electronic device is configured with a user interface capable of displaying virtual keyboards and receiving user input. In particular, a user can select various keys and/or functions of the virtual keyboards via a human finger, a stylus, or other techniques or manipulators.

The method and apparatus respond to user input in modifying the display of various virtual keyboards on the electronic device. More particularly, the method and apparatus can display a virtual keyboard on a user interface of an electronic device and detect a selection, by the user, of the virtual keyboard. The user can resize the selected virtual keyboard by interacting with the user interface according to various interaction techniques. Based on the interaction by the user, the method and apparatus can determine an additional virtual keyboard. For example, the additional virtual keyboard can be a resized version of the virtual keyboard or an altogether different virtual keyboard. Moreover, the method and apparatus can display the additional virtual keyboard on the user interface at a location associated with the user interaction.

The method and apparatus as discussed herein can offer many improvements to existing virtual keyboard functionalities. For example, a user is able to directly interact with the user interface of the electronic device to resize or reshape virtual keyboards, and/or select various versions of the virtual keyboards. The various versions of the virtual keyboards can align with the tasks performed by the user. For example, if the user wishes to input a sequence of numbers, the user may wish to resize a virtual QWERTY keyboard to a Bell-type keypad or a calculator-type keypad. For further example, if the user wishes to hold the electronic device in his/her left hand and input alphanumeric characters with his/her right hand, then the user can select to have the electronic device display a reduced-size QWERTY keyboard closer to the right side of the electronic device. It should be appreciated that other benefits and efficiencies are envisioned.

As used herein, an "electronic device" can be understood to be any type of device including any combination of hardware and software, and supporting various types of input from a user via an interface. For example, the electronic device can be a tablet computer, a smart phone, a laptop computer, a personal data assistant (PDA), a remote controller, or other devices. Further, as used herein, a "virtual keyboard" or "virtual keypad" can be any type of software component that can be displayed on a user interface and on which a user (or other actuating elements such as a stylus) can select alphanumeric characters or symbols. The virtual keyboards can include various types, which have differing amounts, combinations, and layouts of alphanumeric characters and symbols. For example, different types of English alphanumeric keyboards use different layouts such as QWERTY, Dvorak, and Colemak. Also, different types of English alphanumeric keyboards have 101 keys, 60 keys, and 35 keys. Of course, non-English alphabets result in yet more types of keyboards. Yet another type of virtual keyboard can be a numeric keypad, such as a Bell keyboard or a calculator keyboard. Still further types of keyboards include gaming keyboards, point-of-sale keyboards, and custom keyboards. It should be understood that the terms "virtual keyboard" and "virtual keypad" can be used interchangeably.

Figure 1:
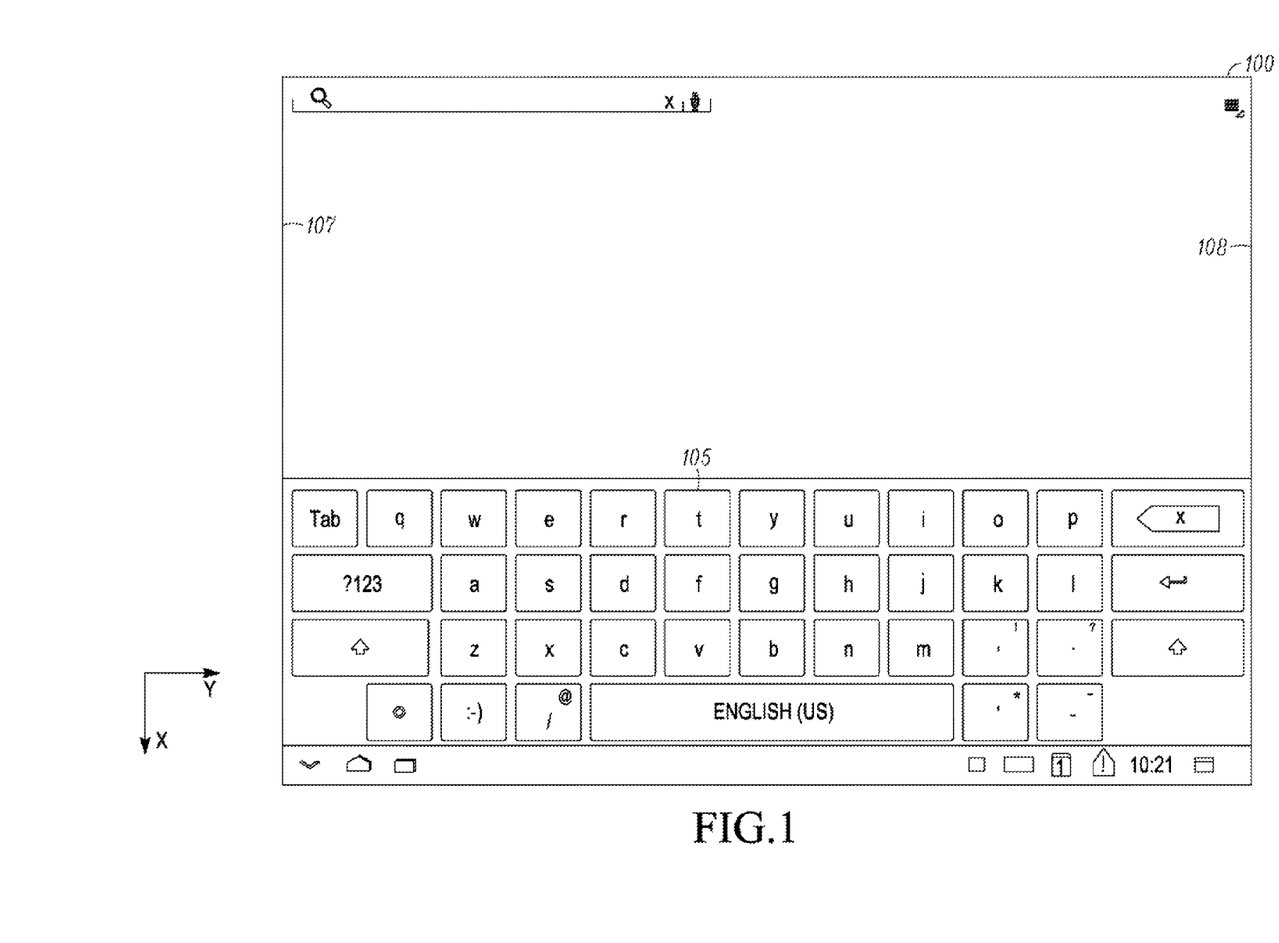
FIG. 1 illustrates an exemplary user interface of an electronic device in accordance with some embodiments.
Figure 2:
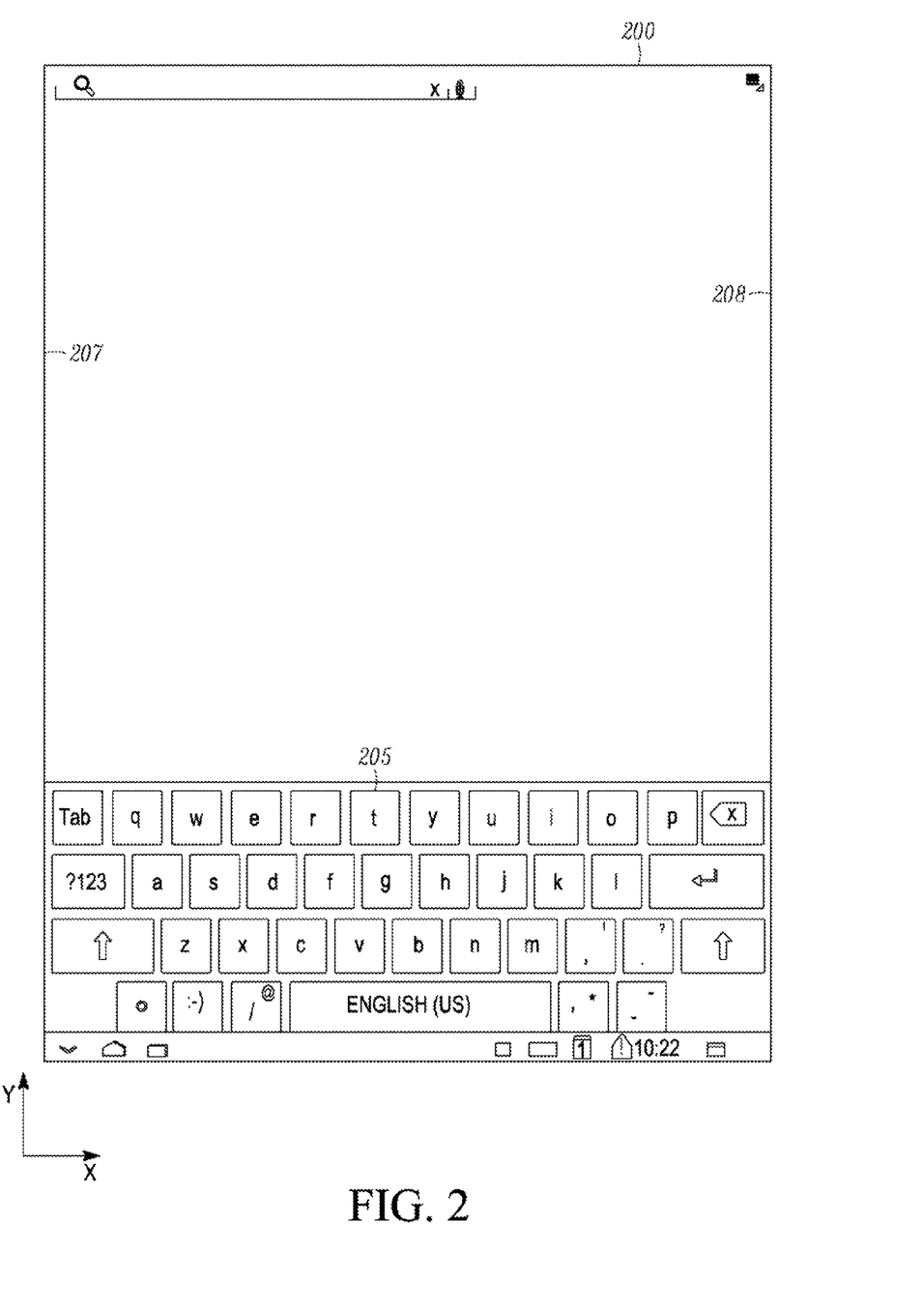
FIG. 2 illustrates an exemplary user interface of an electronic device in accordance with some embodiments.
Figure 3:
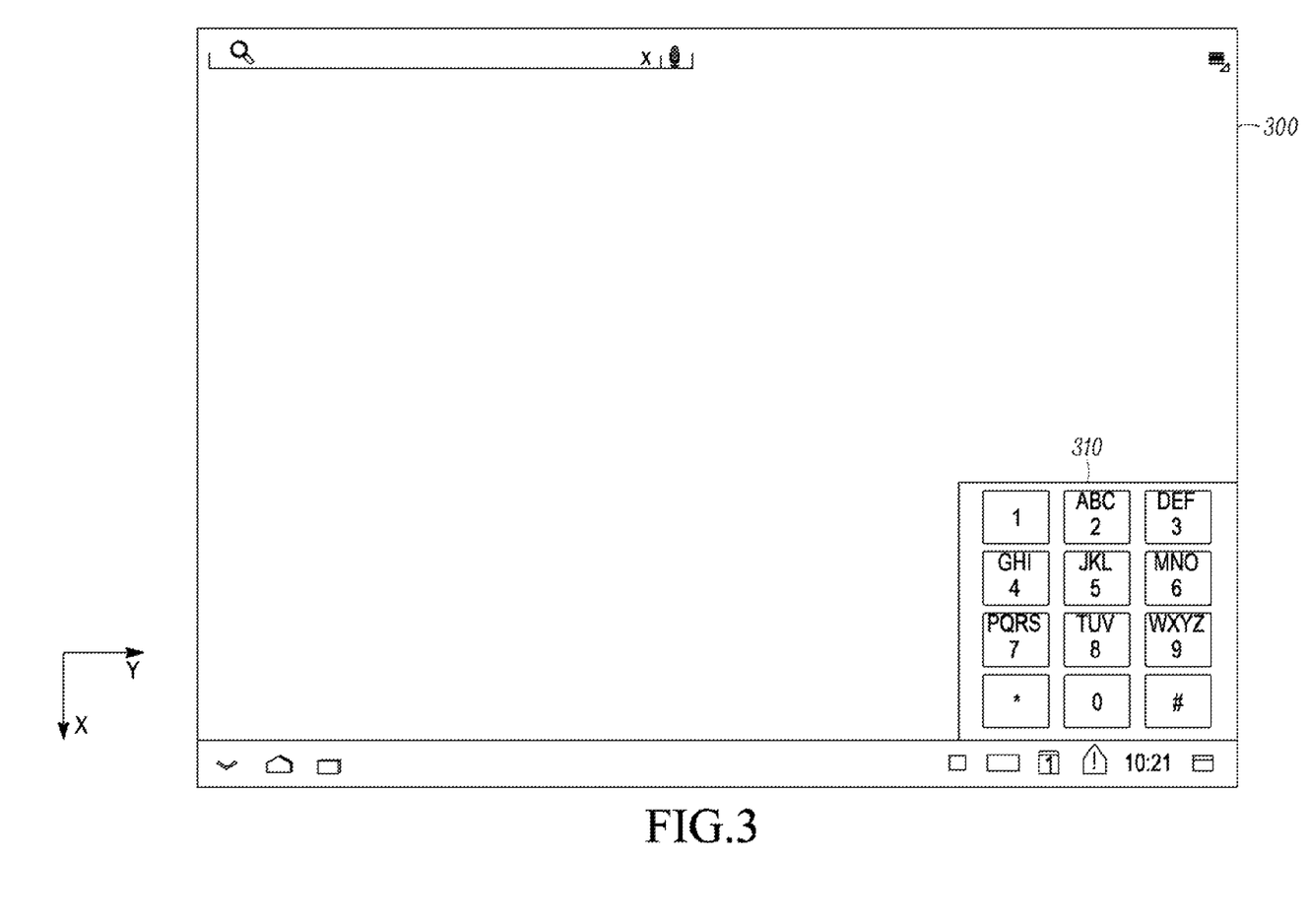
FIG. 3 illustrates an exemplary user interface of an electronic device in accordance with some embodiments.

FIGS. 1-3 illustrate exemplary user interfaces of an electronic device consistent with some embodiments. It should be appreciated that user interfaces 100, 200, 300 as respectively depicted in FIGS. 1-3 are merely exemplary and can include other various layouts and/or combinations of virtual keys including function keys, alphanumeric characters, and symbols.

Referring to FIG. 1, the user interface 100 includes a virtual keyboard 105 configured to be displayed on the user interface 100. The virtual keyboard 105 can be implemented by a combination of hardware and software components of the electronic device. In implementations, the virtual keyboard 105 can be an alphanumeric keypad having alphabetic and numeric characters, as shown in FIG. 1. More particularly, a user of the virtual keyboard 105 can select alphabetic characters, numeric characters, symbols, and/or combinations thereof on the virtual keyboard 105 via various keystroke selections or other input techniques. The selections on the virtual keyboard 105 can be inputs into various applications or functions executing on the electronic device and/or displaying on the user interface 100. Further, in implementations, the virtual keyboard 105 can be a "QWERTY" keyboard (as shown) including various amounts of keys (e.g., 41, 101, or other amounts) or other types and arrangements of keyboard layouts. In implementations as shown in FIG. 1, the virtual keyboard 105 is displayed in a landscape orientation of the user interface 100. More particularly, the sides of the virtual keyboard 105 can extend to opposite wider sides 107, 108 of the user interface 100.

Referring to FIG. 2, the user interface 200 includes a virtual keyboard 205 configured to be displayed on the user interface 200. The virtual keyboard 205 can be implemented by a combination of hardware and software components of the electronic device. Further, the virtual keyboard 205 can have the same or similar components and functionalities as discussed with respect to the virtual keyboard 105 of FIG. 1. Still further, in implementations as shown in FIG. 2, the virtual keyboard 205 is displayed in a portrait orientation of the user interface 200. More particularly, the sides of the virtual keyboard 205 can extend to opposite narrower sides 207, 208 of the user interface 200. Thus, the virtual keyboard 205 is of the same type as virtual keyboard 105 but has a smaller size.

Referring to FIG. 3, the user interface 300 includes a virtual keypad 310 configured to be displayed on the user interface 300. The virtual keypad 310 can be implemented by a combination of hardware and software components of the electronic device. Although the virtual keypad 310 is displayed in a landscape orientation, it should be appreciated that the virtual keypad 310 can also be displayed in a portrait orientation, similar to the virtual keyboard 205 of FIG. 2 without any resizing. Further, although the virtual keypad 310 is in the bottom right corner, as shown, it should be understood that the virtual keypad 310 can be displayed anywhere in the user interface 300. In implementations, the virtual keypad 310 can be a Bell-type keypad having alphabetic and numeric characters, as shown in FIG. 3. More particularly, a user of the virtual keypad 310 can select alphabetic characters, numeric characters, symbols, and/or combinations thereof on the keypad 310 via various keystrokes. For example, if a user selects the "5" key on the virtual keypad 310, the corresponding user interface 305, 315 can reflect the same by displaying a "5" or one or more of the letters associated with the "5" key (e.g., "J," "K," or "L").

Figure 4:
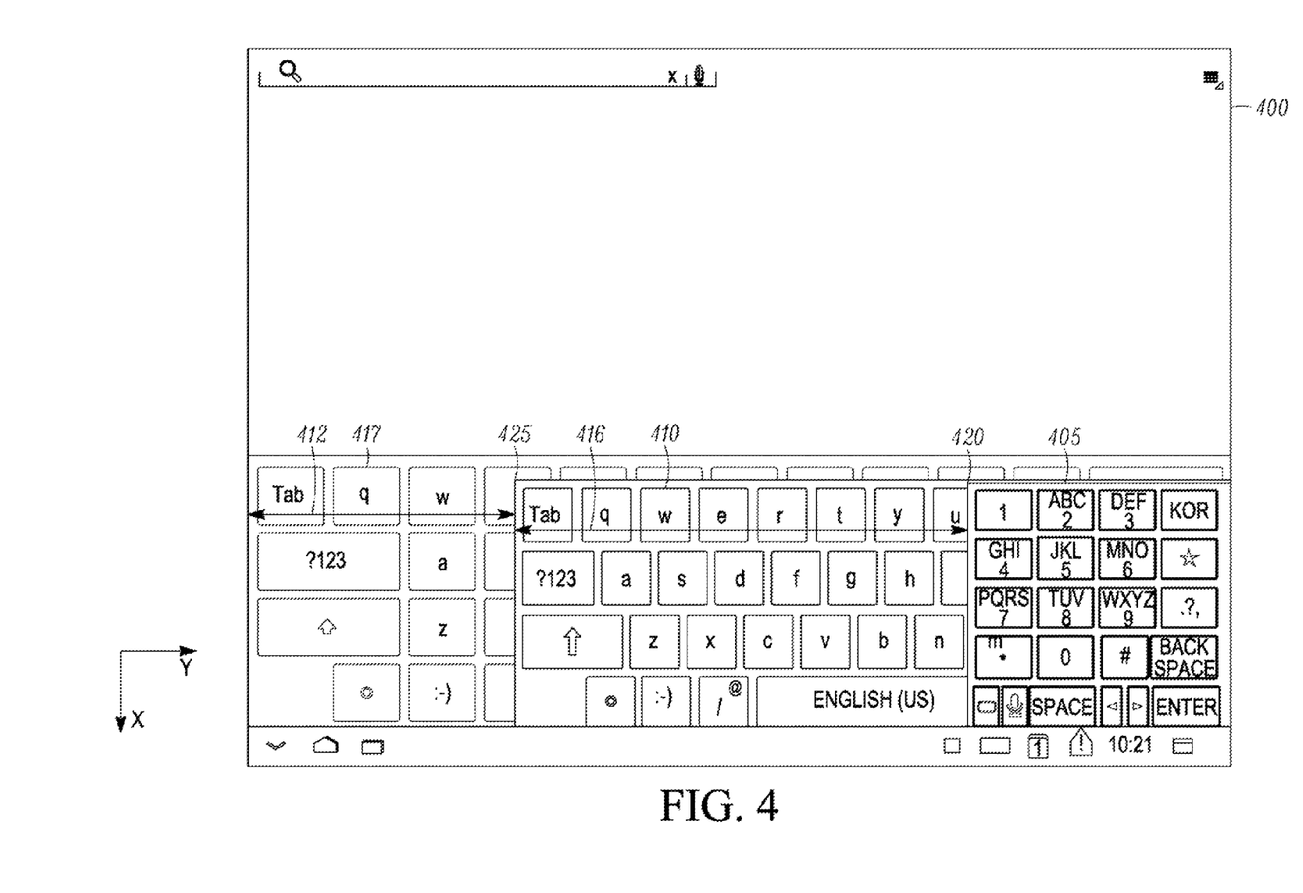
FIG. 4 illustrates an exemplary user interface and functions thereof in accordance with some embodiments.

Referring to FIG. 4, depicted is an exemplary user interface 400 of an electronic device configured to implement the systems and methods as discussed herein. More particularly, the user interface 400 can display a virtual keypad 405, a reduced-size virtual keyboard 410, and a full virtual keyboard 415. In implementations, the virtual keypad 405 can be the same or similar to the virtual keypad 310 as discussed with respect to FIG. 3, the reduced-size virtual keyboard 410 can be the same or similar to the virtual keyboard 205 as discussed with respect to FIG. 2, and the full virtual keyboard 415 can be the same or similar to the keyboard 105 as discussed with respect to FIG. 1. As shown, the full virtual keyboard 415 is an enlarged version of the reduced-size virtual keyboard 410; thus the full virtual keyboard 415 and the reduced-size virtual keyboard 410 are of the same type. Other implementations, however, can present a second virtual keyboard of a different type than a first virtual keyboard. For example, the first virtual keyboard could include more keys than the second virtual keyboard (e.g., the first virtual keyboard has 61 keys while the second virtual keyboard has 35 keys). Thus, two virtual keyboards of differing types can differ in the amount of keys, the combination of keys, and the layout of characters and symbols.

Based on the active software application, one type of virtual keyboard may initially be presented. Alternately, upon launch of a software application, the software application may provide an option for a user to select a particular type of initial virtual keyboard. After the user selects the initial type of virtual keyboard, the user may resize the virtual keyboard. In the process of resizing the virtual keyboard, the virtual keyboard may change from the initial type of virtual keyboard to a different type of virtual keyboard.

According to implementations, a user of the user interface 400 can select any of the virtual keypad 405, the reduced-size virtual keyboard 410, and/or the full virtual keyboard 415 for the purpose of resizing the selection. For example, as shown in FIG. 4, the user can resize the virtual keypad 405 into the reduced virtual keyboard 410, as indicated by 416. Further, for example, the user can resize the reduced virtual keyboard 410 into the full virtual keyboard 415, as indicated by 417. It should be appreciated that other resizing options are envisioned. For instance, the user can create non-standard keyboard sizes (e.g., a landscape-sized virtual keyboard that is "shorter" than virtual keyboard 105 shown in FIG. 1 or a portrait-sized virtual keyboard that is "taller" than the virtual keyboard 205 shown in FIG. 2.)

In selecting a virtual keypad or keyboard to resize, a user can select a portion of a virtual keypad or keyboard. For example, the user can select one of the corners of the virtual keypad or keyboard. In some cases, the user can select an option displayed on the user interface 400 for resizing the virtual keypad or keyboard. After the virtual keypad or keyboard is selected, the user can interact with the user interface 400 in resizing the selection. In some aspects, the user's interaction can have an associated location on the user interface 400. For example, as shown in FIG. 4, the user can resize 416 the virtual keypad 405 into the reduced-size virtual keyboard 410 by selecting a corner 420 of the virtual keypad 405 and "dragging-and-dropping" the corner 420 to an appropriate location 425 of the user interface 400. For further example, if the touchscreen is a multi-touch touchscreen, the user can use a multi-touch gesture, such as a "pinch-to-zoom" gesture interaction, in resizing the selected virtual keypad or keyboard. More particularly, the user can enlarge or condense the size of the selected virtual keypad or keyboard by moving two fingers farther apart or closer together, respectively, while interacting with the user interface 400.

In implementations, the electronic device can determine a different type of virtual keypad or keyboard to display based on the virtual keypad or keyboard that is selected and based on the location associated with the user's interaction with the user interface 400. The different type of virtual keypad or keyboard has a different layout compared to a resized version of the selected virtual keypad or keyboard. For example, if the user selects a virtual numeric keypad and enlarges the virtual numeric keypad according to techniques as discussed herein, then the electronic device can generate a an alphanumeric keyboard (full-size or reduced-size) based on the user's interaction with the user interface 400. For further example, if the user selects a virtual alphanumeric keyboard and condenses the virtual alphanumeric keyboard, then the electronic device can replace the virtual alphanumeric keyboard with a numeric keypad based on the user's interaction with the user interface 400.

In resizing the selected virtual keypad or keyboard or generating the modified virtual keypad or keyboard, the electronic device can implement a freeform resizing technique or a fixed resizing technique. In particular, in the freeform resizing technique, the modified virtual keypad or keyboard can be generated or resized based on locations associated with the user's interaction with the user interface 400. Further, in the fixed resizing technique, the user interface 400 can have associated "fix locations" to which the modified virtual keypad or keyboard can "fix to" or "snap to" based on the user's interaction with the user interface 400.

Figure 5:
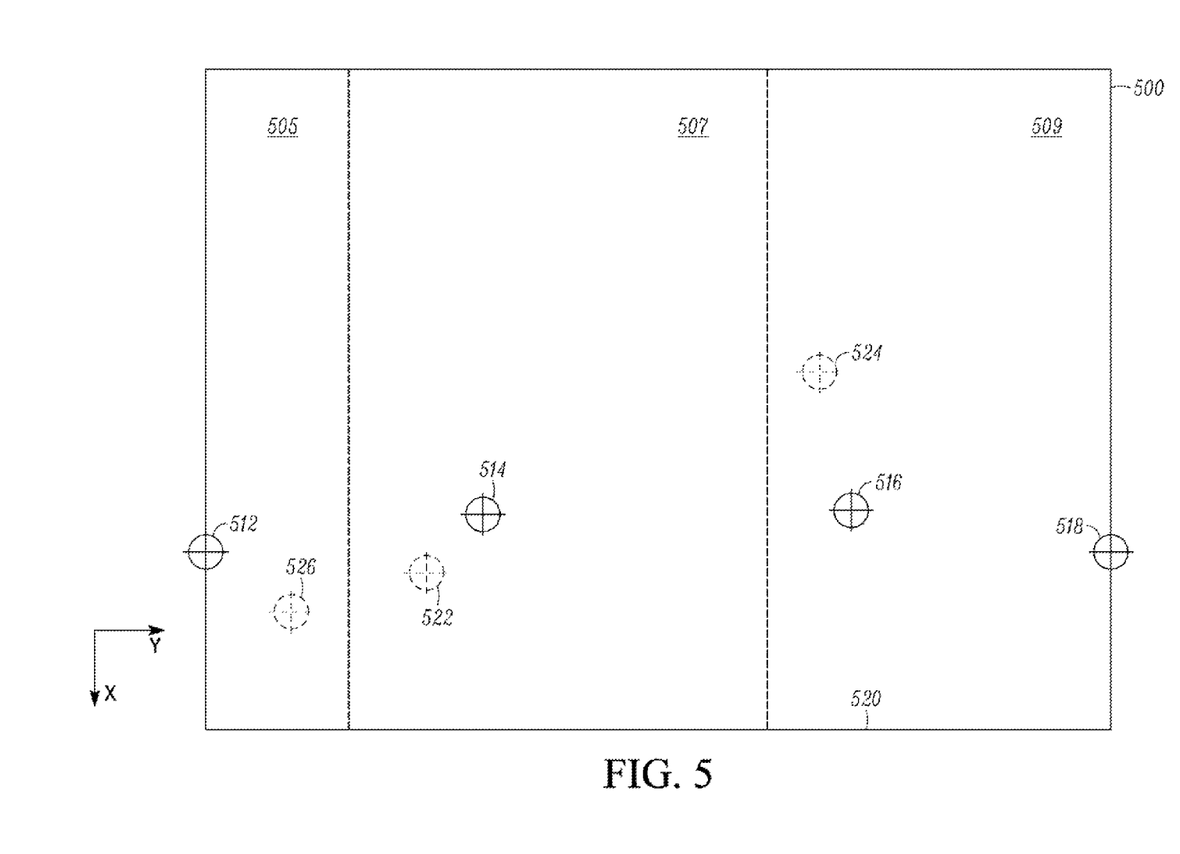
FIG. 5 illustrates an exemplary user interface and functions thereof in accordance with some embodiments.

FIG. 5 details an exemplary user interface 500 of an electronic device. The user interface 500 details exemplary fix locations and predetermined areas used in techniques for resizing virtual keyboards. The user interface 500 includes a set of predefined areas 505, 507, 509 that can dictate the type and size of the modified virtual keyboards. It should be appreciated that the set of predefined areas 505, 507, 509 are merely exemplary, and can include more or fewer areas in various combinations and arrangements. Further, it should be appreciated that FIG. 5 is rendered from an arrangement wherein a bottom right corner of the set of virtual keyboards is located at a bottom right corner of the user interface 500. Accordingly, the set of predefined areas 505, 507, 509 can be adjusted or "mirrored" based on other arrangements, such as if a bottom left corner of the virtual keyboards is located at a bottom left corner of the user interface 500. Still further, as shown in FIG. 5, the user interface 500 and components thereof are rendered in a landscape orientation whereby the top and bottom sides of the set of virtual keyboards are displayed parallel to the wider sides of the user interface 500. In some aspects, the user interface 500 and components thereof can be rendered in a portrait orientation whereby the top and bottom sides of the set of virtual keyboards are displayed parallel to the narrower sides of the user interface 500.

As shown in FIG. 5, the user interface 500 can further include a set of fix locations 512, 514, 516, 518 representing various boundaries of the virtual keyboards and keypads displayed on the user interface 500. For example, a virtual keypad, such as the virtual keypad 310 as discussed with respect to FIG. 3, can be displayed with a top left corner at 516, a top right corner at 518, and a bottom edge 520. For further example, a reduced-size virtual keyboard such as keyboard 205 can be displayed with a top left corner at 512, a top right corner at 518, and the bottom edge 520.

In implementations, the electronic device can generate modified virtual keyboards or keypads based on which predefined area 505, 507, 509 that the user's interaction with the user interface 500 is within. More particularly, the electronic device can identify coordinates associated with the user's interaction and identify the predefined area 505, 507, 509 in which the coordinates are located, and generate the modified virtual keyboard or keypad based on the identified predefined area and the associated fix location. For example, if the user selects the top left corner of a full virtual keyboard at fix location 512, resizes the full virtual keyboard by moving the selection, and releases the selection at exemplary location 522, the electronic device can determine that 522 is within predefined area 507. In response, the electronic device can generate a reduced virtual keyboard and display the reduced virtual keyboard with a top left corner at fix location 514. For further example, if the user selects the top left corner of a reduced virtual keyboard at fix location 514, resizes the reduced keyboard by moving the selection, and releases the selection at exemplary location 524, the electronic device can determine that 524 is within predefined area 509. In response, the electronic device can generate a virtual keypad and display the keypad with a top left corner at fix location 516. Further, for example, if the user selects the top left corner of a virtual keypad at fix location 516, resizes the virtual keypad by moving the selection, and releases the selection at exemplary location 526, the electronic device can determine that 526 is within predefined area 505. In response, the electronic device can generate a full virtual keyboard and display the full virtual keyboard with a top left corner at fix location 512.

In some freeform resizing implementations, the electronic device can generate the modified virtual keyboards based on the locations of the user interactions themselves, without "snapping" or "fixing" the modified virtual keyboards to the set of fix locations 512, 514, 516, 518. For example, if the user selects the top left corner of a virtual keypad at fix location 516, resizes the virtual keypad by moving the selection, and releases the selection at exemplary location 522, the electronic device can determine that 522 is within predefined area 507. In response, the electronic device can generate a reduced virtual keyboard and display the reduced virtual keyboard with a top left corner at exemplary location 522. Further, for example, if the user selects the top left corner of a reduced virtual keyboard at fix location 514, resizes the reduced virtual keyboard by moving the selection, and releases the selection at exemplary location 524, the electronic device can determine that 524 is within predefined area 509. In response, the electronic device can generate a virtual keypad and display the virtual keypad with a top left corner at exemplary location 524.

In further implementations, the electronic device can generate the modified virtual keyboards based on relative locations of the user interactions with the user interfaces. In particular, instead of the user resizing a virtual keyboard to a location at or near where the modified virtual keyboard will be displayed, the user can use the relative location functionality to perform less exaggerated virtual keyboard resizing interactions. In aspects, the user can select, at a first location, a virtual keyboard to resize; and drag the selection (or otherwise resize the virtual keyboard) to a second location on the user interface. The electronic device can determine a distance between the first location and the second location, and compare the distance to a set of threshold values. Alternately or additionally, the speed of the selection motion may also be used to help determine whether to only resize the virtual keyboard or whether to change the virtual keyboard type. For example, the set of threshold values can be values that can dictate which modified virtual keyboard will need to be displayed based on the originally-selected virtual keyboard. As another example, a fast "swipe" gesture might cause the virtual keyboard to change type while a slow swipe (e.g., having the same starting and ending points as the fast swipe, but taking longer to reach the ending point from the starting point) might only result in resizing without changing the type of virtual keyboard.

For example, referring back to FIG. 5, if the user selects the top left corner of a full virtual keyboard at fix location 512, resizes the full virtual keyboard by moving the selection, and releases the selection at exemplary location 526, the electronic device can determine that the distance between 512 and 526 falls into a threshold that dictates that the full virtual keyboard be resized to a reduced virtual keyboard. In response, the electronic device can generate a reduced-size virtual keyboard and display the reduced-size virtual keyboard with a top left corner at fix location 514. In another example, if the user selects the top left corner of a full virtual keyboard at fix location 512, resizes the full virtual keyboard by quickly moving the selection, and releases the selection at exemplary location 522, the electronic device can determine that the distance between 512 and 522 falls into a speed and distance threshold that dictates that the full virtual alphanumeric keyboard be changed to a different type of virtual keyboard, namely a virtual numeric keypad. In response, the electronic device can generate a virtual keypad and display the virtual keypad with a top left corner at fix location 516. Accordingly, the user does not need to resize the full virtual keyboard to the fix location 516 itself, or otherwise to the predefined area 509.

Figure 6:
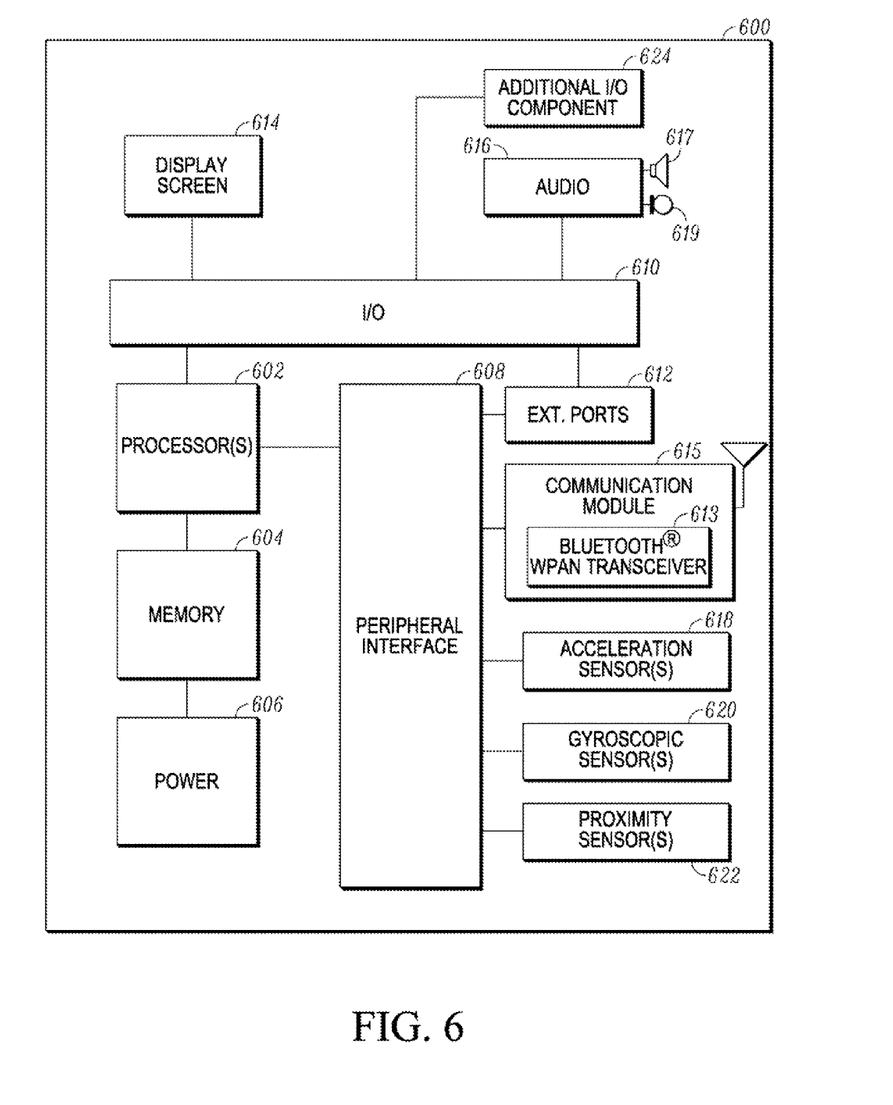
FIG. 6 is a block diagram of an electronic device in accordance with some embodiments.

FIG. 6 illustrates an electronic device 600 in which the method and apparatus may be implemented, according to an embodiment. The electronic device 600 can include one or more microprocessors 602; one or more memory devices 604 (e.g., flash memory, hard drives, MicroSD cards, and others); a power module 606 (e.g., batteries, charging circuits, and others); a peripheral interface 608; and one or more external ports 612 (e.g., Universal Serial Bus (USB) ports, Firewire ports, HDMI ports, GPS ports, cellular ports, and others). The electronic device 600 can further include a communication module 615 to implement the one or more external ports 612, such as a wired or wireless data connection. More particularly, the communication module 615 can include an RF transceiver that can function in accordance with IEEE 802.11, Zigbee, or other standards, and/or other components such as a GPS receiver. The communication module 615 can also communicate with a wide area network (not shown in figures), such as a cellular network including one or more cell sites or base stations to communicatively connect the electronic device 600 to additional devices. The communication module 615 can include radio transceivers that communicate with a local area network (not shown in figures) or other networks. The communication module 615 can also include a Bluetooth® WPAN transceiver 613 that can connect to elements in a wireless personal area network (e.g., a Bluetooth headset).

The electronic device 600 can include an audio module 616 configured with a microphone port 619 for receiving audio and a speaker port 617 for outputting audio. Further, the electronic device 600 can include one or more sensors (e.g., acceleration sensors 618 (e.g., three linear-axis sensors), gyroscopic sensors 620 (e.g., three angular-axis sensors), proximity sensors 622 (e.g., infrared receivers or transceivers), and other sensors); an input/output (I/O) controller 610, a display screen 614 (e.g., a touchscreen); and additional I/O components 624 (e.g., keys, buttons, lights, LEDs, cursor control devices, microphones, speakers, haptic devices, and others). The display screen 614 and the additional I/O components 624 may be considered to form portions of a user interface (e.g., portions of the device 600 associated with presenting information to the user and/or receiving inputs from the user). In any given embodiment, more, fewer, or different ones of such electronic components may be present in the electronic device 600.

In implementations, the display screen 614 can be a touchscreen display configured to interact with various manipulators, such as a human finger or a stylus. Each type of manipulator, when brought into contact with or close proximity to the display screen 614, can cause the display screen 614 (and/or a display driver associated with the display screen 614) to produce a signal that can be received and interpreted as a touch event by the processor 602. The processor 602 can be suitably configured, through any combination of hardware and software components, to determine the location of the contact on the surface of the touchscreen 614, as well as other selected attributes of the touch event (e.g., movement of the manipulator(s) across the surface of the screen, directions and velocities of such movement, touch pressure, touch duration, and others).

In an embodiment in which the display screen 614 is a touchscreen display, the display screen 614 can include a thin, transparent touch sensor component superimposed upon a display (e.g., a Liquid Crystal Display (LCD) or other type of display) that is viewable by a user. Examples of such displays include capacitive displays, resistive displays, surface acoustic wave (SAW) displays, optical imaging displays, and the like. The display screen 614 or one of the additional I/O components 624 may also provide haptic feedback to the user (e.g., a clicking response or keypress feel) in response to a touch event. Embodiments contemplate any suitable touch sensitive surface or sensor. In alternate embodiments, the display screen 614 can be replaced with a display screen that does not include a touch sensitive surface or sensor, and a user can select locations on the display screen by moving a displayed cursor to such locations using a cursor control device (e.g., a mouse, a touchpad, or a trackball) or another type of user input, and selecting the locations (e.g., with a cursor click).

The display screen 614 can have any suitable rectilinear or curvilinear shape, and may be oriented in any desired fashion. The illustrated embodiments, without loss of generality, depict rectangular regions oriented in a portrait or landscape orientation (i.e., with respect to a user holding the device). However, embodiments of the present invention comprehend any range of shapes, sizes, and orientations for the display screen 614.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 602 (e.g., working in connection with an operating system) to implement a user interface method as described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and others).

Figure 7:
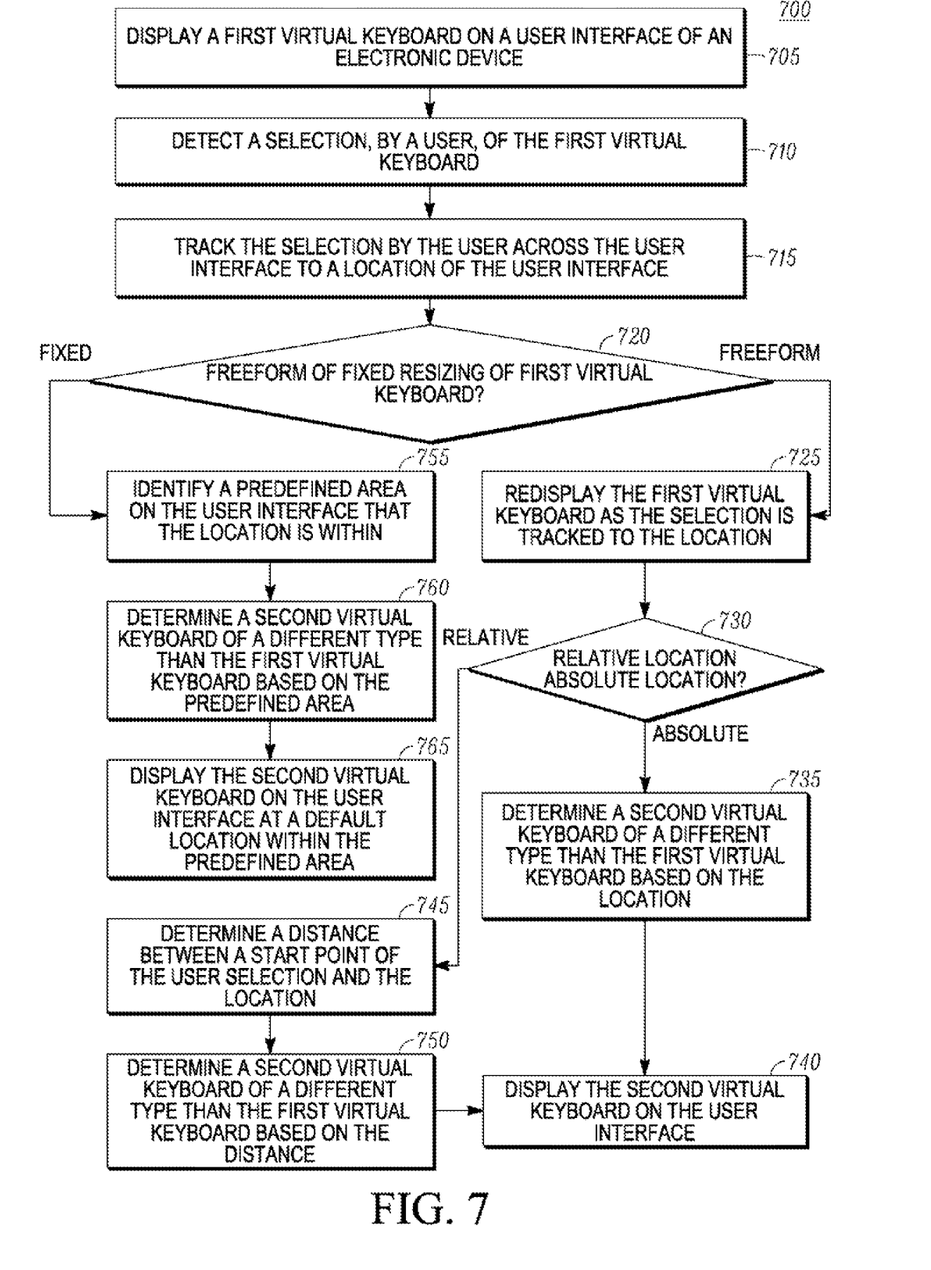
FIG. 7 is a flow diagram depicting modifying virtual keyboards in accordance with some embodiments.

FIG. 7 is a flowchart of a method 700 for an electronic device (such as the electronic device 600 as shown in FIG. 6) to modify a virtual keyboard. The method 700 begins with the electronic device displaying 705 a first virtual keyboard on a user interface of the electronic device. The electronic device can be oriented in a landscape or portrait orientation, and the first virtual keyboard can be a QWERTY keyboard, a reduced QWERTY keyboard, or a keypad. The electronic device detects 710 a selection, by a user, of the first virtual keyboard. In some implementations, the user can select a portion, such as a corner, of the first virtual keyboard. In other implementations, the user can select a function from a drop-down menu to modify the first virtual keyboard prior to selecting the first virtual keyboard.

The electronic device tracks 715 the selection by the user across the user interface to a location of the user interface. For example, the user can drag-and-drop a selected portion of the first virtual keyboard to the location. In other example, the user can additionally select the location of the user interface after selecting the first virtual keyboard in a gesture that involves two sequential touches. Further, for example if supported by a multi-touch touchscreen, the user can use a multi-touch gesture, such as a pinch-to-zoom gesture interaction, after selecting the first virtual keyboard. The electronic device determines 720 whether the first virtual keyboard has a freeform resizing function or a fixed resizing technique. In particular, in a freeform resizing technique, the size of a resized virtual keyboard is dictated by the selection by the user across the user interface. In a fixed resizing technique, the electronic device can have a set of fixed or default locations on the user interface to which a virtual keyboard will "fix" or "snap" based on the selection by the user.

If the first virtual keyboard has a freeform resizing technique ("FREEFORM"), the electronic device redisplays 725 the first virtual keyboard as the selection by the user is tracked to the location. In some implementations, the electronic device can continuously re-display the virtual keyboard with different dimensions, or as different types of virtual keyboards, as the user drags the selection across the user interface. The electronic device determines 730 whether the virtual keyboard modification is based on a relative location or an absolute location. If the virtual keyboard modification is based on an absolute location ("ABSOLUTE"), the electronic device determines 735 a second virtual keyboard of a different type than the first virtual keyboard based on the location. More particularly, the electronic device can determine the second virtual keyboard based on a size as defined by the location and the stationary corner of the keyboard or based on a predefined area that the location is within. For example, if the user enlarges a keypad to meet or exceed a threshold size in the X dimension, the Y dimension, or both the X and Y dimensions, then the second virtual keyboard can be a full QWERTY keyboard or a reduced-size QWERTY keyboard. Further, the electronic device displays 740 the second virtual keyboard on the user interface. For example, a corner of the second virtual keyboard, or other portions or sections of the second virtual keyboard, can be positioned at the location after the user has completed resizing the selection. In some implementations, the second virtual keyboard can be of a type that was last displayed in the redisplay 725 of the first virtual keyboard.

Returning to step 730, if the virtual keyboard modification is based on a relative location ("RELATIVE"), the electronic device determines 745 a distance between a start point of the user selection and the location. Further, the electronic device determines 750 a second virtual keyboard of a different type than the first virtual keyboard based on the distance. More particularly, the electronic device can compare the distance to a set of threshold values to determine the second virtual keyboard. For example, if the user resizes a Bell-type keypad a short distance, and the distance meets or exceeds a first threshold value, then the determined second virtual keyboard can be a reduced-size QWERTY keyboard. For further example, if the user resizes a Bell-type keypad a further distance, and the further distance meets or exceeds a second threshold value (e.g., a value greater than the first threshold value), then the determined second virtual keyboard can be a full-size QWERTY keyboard. After the second virtual keyboard is determined, the electronic device displays 740 the second virtual keyboard on the user interface. As an alternate to distance, the size (in the X-dimension, the Y-dimension, or the XY-dimensions) indicated by the location and the stationary corner of the keyboard can be used to determine the second virtual keyboard.

Going back to step 720, if the first virtual keyboard has a fixed resizing function ("FIXED"), the electronic device identifies 755 a predefined area on the user interface that the location is within. More particularly, the electronic device can have one or more predefined areas that correspond to various virtual keyboards. Although the embodiment presented with respect to FIG. 5 has fixed areas based on an assumption that the virtual keyboards will be anchored to a lower right corner of the display screen, the predefined areas may also be dynamically determined based on the margins of the virtual keyboard as currently displayed. After the predefined area is identified, the electronic device determines 760 a second virtual keyboard of a different type than the first virtual keyboard based on the predefined area. For example, if the predefined area is along a wider edge of the user interface in a landscape orientation, then the second virtual keyboard can be a full QWERTY keyboard. After the second virtual keyboard is determined, the electronic device displays 765 the second virtual keyboard on the user interface at a default location within the predefined area. For example, a corner of the second virtual keyboard, or other portions or sections of the second virtual keyboard, can be positioned at the default location.

Thus, it should be clear from the preceding disclosure that a method and apparatus manages the modification of virtual keyboards. The method and apparatus advantageously allows a user of the electronic device to resize virtual keyboards according to interactions with a user interface of the electronic device.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in an electronic device, the method comprising:
    displaying a first virtual keyboard of a first keyboard type on a user interface of the electronic device, wherein the first keyboard type specifies a first layout of keys;
    identifying a user interaction with the first virtual keyboard, the user interaction comprising:
    selecting a corner of the first virtual keyboard, and
    a drag motion across the user interface; and
    during the drag motion across the user interface:
        continuously re-displaying a resized version of the first virtual keyboard on the user interface;
        determining, based on the drag motion and one or more changed dimensions of the first virtual keyboard, a second keyboard type that specifies a second layout of keys that is different than the first layout of keys; and
        responsive to determining the second keyboard type, replacing the first virtual keyboard on the user interface with a second virtual keyboard of the second keyboard type.

2. The method of claim 1, wherein the determining of the second keyboard type comprises:

identifying a predefined area on the user interface, wherein the drag motion is detected within the predefined area; and determining the second virtual keyboard based on the predefined area.

3. The method of claim 2, wherein the identifying the predefined area comprises:

identifying a horizontal coordinate of the drag motion and a vertical coordinate of the drag motion; and determining that the horizontal coordinate and the vertical coordinate are within the predefined area.

4. The method of claim 2, wherein the identifying the predefined area comprises:

resizing the first virtual keyboard during the drag motion; and detecting the drag motion reaching the predefined area.

5. The method of claim 1, further comprising:

detecting a termination of the drag motion.

6. The method of claim 1, wherein identifying the user interaction comprises:

detecting a first user selection of the first virtual keyboard; and detecting a second user selection at the corner of the first virtual keyboard.

7. The method of claim 1, wherein the first virtual keyboard is one of a QWERTY keyboard, a reduced QWERTY keyboard, or a keypad.

8. The method of claim 1, wherein the second virtual keyboard is one of a QWERTY keyboard, a reduced QWERTY keyboard, or a keypad.

9. The method of claim 1, wherein the determining of the second keyboard type comprises:

calculating a distance between the drag motion and a portion of the first virtual keyboard; and comparing the distance to a predefined distance to determine the second virtual keyboard.

10. An electronic device comprising:

a user interface configured to display content and receive input from a user;

a processor, coupled to the user interface, that is configured to:

display a first virtual keyboard of a first keyboard type on the user interface, wherein the first keyboard type specifies a first layout of keys;

identify a user interaction with the first virtual keyboard, the user interaction comprising:

select a corner of the first virtual keyboard, and a drag motion across the user interface; and during the drag motion across the user interface:

continuously re-display a resized version of the first virtual keyboard on the user interface;

determine, based on the drag motion and one or more changed dimensions of the first virtual keyboard, a second virtual keyboard type that specifies a second layout of keys that is different than the first layout of keys; and responsive to determining the second keyboard type, replace the first virtual keyboard on the user interface with a second virtual keyboard of the second keyboard type.

11. The electronic device of claim 10, wherein the processor is also configured to:

identify a horizontal coordinate of the drag motion and a vertical coordinate of the drag motion;

determine that the horizontal coordinate and the vertical coordinate are within a predefined area on the user interface; and determine the layout for the second virtual keyboard based on the predefined area.

12. The electronic device of claim 11, wherein the processor is also configured to:

detect the drag motion reaching the predefined area.

13. The electronic device of claim 10, wherein the processor is also configured to:

detect a termination position of the drag motion.

14. The electronic device of claim 10, wherein the processor is also configured to:

detect a first touch by the user; and detect a second touch by the user, wherein the first touch selects the first virtual keyboard and the second touch selects the corner of the first virtual keyboard.

15. The electronic device of claim 10, wherein the first virtual keyboard is an alphanumeric keyboard.

16. The electronic device of claim 15, wherein the second virtual keyboard is a numeric keypad.

17. The electronic device of claim 10, wherein the processor is also configured to:

calculate a distance between the drag motion and a portion of the first virtual keyboard; and compare the distance to a predefined distance to determine the second virtual keyboard.

18. The electronic device of claim 10, wherein the user interface comprises a touchscreen.

19. The electronic device of claim 18, wherein the touchscreen is a multi-touch touchscreen.

20. A method in an electronic device, the method comprising:

detecting a user selection of a corner of a first virtual keyboard of a first keyboard type displayed on a user interface of the electronic device, wherein the first keyboard type specifies a first layout of keys;

tracking a drag motion of the user selection across the user interface;

during the drag motion of the user selection across the user interface:

continuously re-displaying a resized version of the first virtual keyboard on the user interface;

determining, by a processor and based on the drag motion and one or more changed dimensions of the first virtual keyboard, a second virtual keyboard of a second keyboard type that specifies a second layout of keys that is different than the first layout of keys; and responsive to determining the second keyboard type, replacing the first virtual keyboard on the user interface with the second virtual keyboard of the second keyboard type;

detecting a termination of the drag motion at a location of the user interface; and fixing the second virtual keyboard at the location.

21. The method of claim 20, wherein the determining of the second keyboard type comprises:

identifying a predefined area on the user interface, wherein the drag motion is detected within the predefined area; and determining the second virtual keyboard based on the predefined area.

22. The method of claim 20, wherein the determining comprises:

calculating a distance between the drag motion and the portion of the first virtual keyboard; and comparing the distance to a predefined distance to determine the second virtual keyboard.

* * * * *